United States Patent Office 3,021,217
Patented Feb. 13, 1962

3,021,217
BACITRACIN PRODUCT AND PROCESSES
UTILIZING COBALT COMPOUNDS
Ralph Allan Zorn, Muscatine, Iowa, assignor to Grain Processing Corporation, Muscatine, Iowa, a corporation of Iowa
No Drawing. Filed June 13, 1958, Ser. No. 741,726
6 Claims. (Cl. 99—2)

This invention relates to a bacitracin product and the process for preparing the same.

It is well known that bacitracin may be prepared by the cultivation of microorganisms and particularly *Bacillus subtillis*. This antibiotic has recently found considerable application in preparation of feeds for poultry and livestocks. Thus when bacitracin is incorporated into feeds, a marked stimulation of the growth of the poultry or livestock is observed.

One difficulty with bacitracin is, however, that it is unstable under ordinary conditions of storage. Also, in production of bacitracin by fermentation methods a considerable amount of the bacitracin may be lost during the normal process of recovery, which process usually involves the steps of evaporating and drum drying the fermentation mash.

Accordingly, it is an object of this invention to provide a bacitracin composition which has a high degree of stability upon storage.

A further object of this invention is the provision of an animal feed supplement containing bactracin which has been stabilized against deterioration upon storage even under the conditions of high humidity.

A still further object of this invention is the provision of a process for recovering bacitracin in a manner which permits a high percentage of recovery with small losses as compared to prior art recovery procedures.

Further and additional objects will appear from the following description and the accompanying claims.

In accordance with one embodiment of this invention it has been found that an improved bacitracin-containing product may be prepared by adding thereto a small amount of a water-soluble compound of cobalt. The cobalt serves to stabilize the bacitracin against deterioration on storage. The invention is particularly useful in the preparation of animal feed supplements which contain a nutrient base and bacitracin. In this instance the bacitracin has also been treated with a water-soluble cobalt salt in order to stabilize the bacitracin in the feed product.

This invention has particular utility in the treatment of fermentation mashes for the recovery of bacitracin. Thus in accordance with this invention, the fermentation mash containing the bacitracin is treated with a small amount of water-soluble cobalt salt prior to the time that the fermentation mash is evaporated and drum dried. It has been discovered that the incorporation of cobalt salt in this manner only a comparatively small amount of bacitracin is lost in the subsequent concentrating and drying procedures.

For a more complete understanding of this invention, reference will now be made to a specific example. It will be understood, of course, that the invention is not to be limited to the specific example given, since it will be apparent that many modifications may be made without departing from the spirit and scope of the invention.

An aqueous fermentation medium was prepared containing 7.5 percent soybean flour, 2.0 percent cornstarch, 1.0 percent calcium carbonate, and 0.33 percent magnesium sulfate. This medium was sterilized by conventional techniques and was then inoculated with one-half volume percent of a 24-hour liquid culture of *Bacillus subtilis*. The inoculated medium was then incubated at about 30° C. under constant aeration conditions for a period of 30 hours. At the end of the fermentation period the pH was about 8.1.

After the fermentation had been completed, 1.0 percent by weight of cobalt sulfate was added to the liquid fermentation mash and thereafter the fermentation mash was concentrated in a conventional evaporator and then drum dried. This product is suitable for sale to feed manufacturers as such, or it may be standardized to a predetermined bacitracin potency utilizing corn meal, soybean meal, or other nutrient diluent. Thus, one suitable feed supplement is one in which about equal parts of drum-dried material and corn meal are blended to produce a product containing 10 grams of bacitracin per pound of feed supplement.

A characteristic of the drum-dried material and of the feed supplement is that the bacitracin contained therein is very stable under storage conditions. This is particularly important where the bacitracin is employed in feeds that may be stored for some time before being consumed.

It has been determined that the cobalt provides the storage stability for the bacitracin. At the present time it is not known in what manner the cobalt acts to stabilize the bacitracin. For example, it is not known whether the cobalt forms a salt or a complex with the bacitracin materials. It can only be stated at the present time that the cobalt serves as a stabilizing agent.

In the foregoing example cobalt sulfate has been referred to as the specific compound which was the vehicle for incorporating cobalt into the bacitracin. However, it will be apparent that any of the nontoxic, water-soluble salts of cobalt may be included such as cobalt bromide, cobalt chlorate, cobalt iodide, cobalt propionate and the like. Generally speaking, the amount of cobalt sulfate employed should be between about .01 percent and 5.0 percent of the weight of the fermentation mash treated with it. Preferably, however, this range is between 0.3 percent and 2.0 percent. Expressed in terms of bacitracin potency, the concentration of cobalt employed should be between about 0.4 percent and 200 percent of the weight of bacitracin.

In the foregoing example one particular fermentation medium is referred to. However, it will be apparent to one skilled in the art that there may be variations in this regard and that any fermentation medium known to be suitable for producing bacitracin by *Bacillus subtilis* may be included. The important ingredients are, of course, water, metabolizable carbohydrate and a nitrogen source such as assimilable protein.

While a particular embodiment of this invention has been described in the foregoing, it will of course be apparent that the invention is not be limited thereto but rather is to be restricted only by the scope of the appended claims.

I claim:

1. In a process for recovering bacitracin, the steps of adding a water-soluble cobalt salt to a bacitracin-containing aqueous fermentation mash and thereafter removing water from said mash by evaporation.

2. In a process for recovering bacitracin, the steps of adding a water-soluble cobalt salt to a bacitracin-containing aqueous fermentation mash, the amount of said salt being between about 0.01 and about 5.0 percent of the weight of said mash, and thereafter removing at least a portion of the water from the treated mash by evaporation.

3. A dry fermentation mash containing macitracin having added thereto in the presence of water a small amount of a water-soluble salt of cobalt in an amount sufficient to stabilize the bacitracin in the mash.

4. A dry fermentation mash containing bacitracin having added thereto in the presence of water a water-soluble salt of cobalt, the concentration of cobalt in the composition being about 0.4 and about 200% of the weight of the bacitracin therein.

5. An animal feed supplement comprising a dry fermentation residue containing bacitracin having added thereto in the presence of water a small amount of a water-soluble salt of cobalt sufficient to stabilize the bacitracin.

6. An animal feed supplement comprising a dry fermentation residue containing bacitracin having added thereto in the presence of water a water-soluble salt of cobalt sufficient to stabilize the bacitracin, the concentration of the cobalt in said supplement being between about 0.4 and about 200% of the weight of the bacitracin therein.

References Cited in the file of this patent

UNITED STATES PATENTS

| | | |
|---|---|---|
| 2,803,584 | Hodge | Aug. 20, 1957 |
| 2,895,830 | Roe | July 21, 1959 |

FOREIGN PATENTS

| | | |
|---|---|---|
| 513,316 | Canada | May 31, 1955 |

OTHER REFERENCES

Morrison: Feeds and Feeding, pp. 124–126, 1951, Morrison Publishing Co., Ithaca, N.Y.

UNITED STATES PATENT OFFICE
CERTIFICATE OF CORRECTION

Patent No. 3,021,217                February 13, 1962

Ralph Allan Zorn

It is hereby certified that error appears in the above numbered patent requiring correction and that the said Letters Patent should read as corrected below.

Column 1, line 30, for "bactracin" read -- bacitracin --; line 56, after "that" insert -- by --; column 2, line 67, for "macitracin" read -- bacitracin --.

Signed and sealed this 19th day of June 1962.

(SEAL)
Attest:

ERNEST W. SWIDER
Attesting Officer

DAVID L. LADD
Commissioner of Patents